United States Patent
Liao et al.

(10) Patent No.: US 11,854,297 B2
(45) Date of Patent: Dec. 26, 2023

(54) SENSING DEVICE AND METHOD FOR DRIVING SENSING PIXELS

(71) Applicant: InnoLux Corporation, Miao-Li County (TW)

(72) Inventors: Chien-Chih Liao, Miao-Li County (TW); Hsing-Yuan Hsu, Miao-Li County (TW); Po-Yang Chen, Miao-Li County (TW); I-An Yao, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

(21) Appl. No.: 17/965,789

(22) Filed: Oct. 14, 2022

(65) Prior Publication Data

US 2023/0035759 A1    Feb. 2, 2023

Related U.S. Application Data

(63) Continuation of application No. 17/209,207, filed on Mar. 22, 2021, now Pat. No. 11,501,558.

(30) Foreign Application Priority Data

Apr. 20, 2020 (CN) .......................... 202010311139.3

(51) Int. Cl.
*G06V 40/13* (2022.01)
*G06V 10/147* (2022.01)
*H04N 25/75* (2023.01)

(52) U.S. Cl.
CPC ........ *G06V 40/1318* (2022.01); *G06V 10/147* (2022.01); *H04N 25/75* (2023.01)

(58) Field of Classification Search
CPC ... H04N 25/75; G06V 40/1318; G06V 10/147
USPC .......................................................... 348/294
See application file for complete search history.

(56) References Cited

U.S. PATENT DOCUMENTS

2009/0224140 A1* 9/2009 Gomi .................. H04N 25/616
250/214.1
2009/0295970 A1* 12/2009 Fukuoka .............. H04N 25/616
348/308

* cited by examiner

Primary Examiner — Joel W Fosselman
(74) Attorney, Agent, or Firm — Winston Hsu

(57) ABSTRACT

Sensing pixels each store a sensing voltage level. A method for driving the plurality of sensing pixels includes providing a plurality of readout scan signals to the plurality of sensing pixels, and providing a plurality of reset scan signals to the plurality of sensing pixels. One of the plurality of readout scan signals enables one of the plurality of sensing pixels to output the sensing voltage level stored in the one of the plurality of sensing pixels. One of plurality of reset scan signals resets the sensing voltage level stored in one of the plurality of sensing pixels. An $n^{th}$ reset scan signal of the plurality of reset scan signals is started behind an $n^{th}$ readout scan signal of the plurality of readout scan signals in time domain.

16 Claims, 7 Drawing Sheets

SENSING DEVICE AND METHOD FOR DRIVING SENSING PIXELS

CROSS REFERENCE TO RELATED APPLICATIONS

This application is a continuation application of U.S. application Ser. No. 17/209,207, filed on Mar. 22, 2021. The content of the application is incorporated herein by reference.

BACKGROUND OF THE DISCLOSURE

1. Field of the Disclosure

The disclosure relates to a sensing device and a method for driving sensing pixels, and more particularly, a method for driving sensing pixels which can simplify the driving circuits.

2. Description of the Prior Art

As electronic devices become more and more widely used, electronic devices often can perform biometric recognition, for example, the identity of a user can be verified by recognizing the user's fingerprint.

For example, an electronic device uses a photo-diode to capture the fingerprint characteristics of the user for identification. In particular, to facilitate user operations, the photo-diode is integrated with the display panel of the electronic device. In this case, the circuit for driving the photo-diode and the circuit for driving the display panel are both arranged in the peripheral area of the display panel, which makes it difficult to reduce the width of the peripheral area of the display panel.

SUMMARY OF THE DISCLOSURE

An embodiment of the disclosure discloses a method for driving sensing pixels each storing a sensing voltage level. The method comprises providing a plurality of readout scan signals to the sensing pixels via M readout scan lines, and providing a plurality of reset scan signals to the sensing pixels via M reset scan lines. M is an integer. One readout scan signal enables one of the sensing pixels to output the sensing voltage level stored in the one of the sensing pixels. One reset scan signal resets the sensing voltage level stored in one of the sensing pixels. The plurality of readout scan signals are outputted to the plurality of sensing pixels in a first order, and the plurality of reset scan signals are outputted to the plurality of sensing pixels in a second order. An $n^{th}$ reset scan signal of the plurality of reset scan signals in the second order is started behind an $n^{th}$ readout scan signal of the plurality of readout scan signals in the first order in time domain, and $1 \leq n \leq M$.

Another embodiment of the disclosure discloses a sensing device comprising a plurality of sensing pixels, each of the plurality of sensing pixels storing a sensing voltage level. The driving circuit is electrically connected to the plurality of sensing pixels for providing a plurality of readout scan signals to the sensing pixels via M readout scan lines, and providing a plurality of reset scan signals to the sensing pixels via M reset scan lines. M is an integer greater. One readout scan signal enables one of the plurality of sensing pixels to output the sensing voltage level stored in the one of the plurality of sensing pixels. One reset scan signal resets the sensing voltage level stored in one of the plurality of sensing pixels. The plurality of readout scan signals are outputted to the plurality of sensing pixels in a first order, and the plurality of reset scan signals are outputted to the plurality of sensing pixels in a second order. An $n^{th}$ reset scan signal of the plurality of reset scan signals in the second order is started behind an $n^{th}$ readout scan signal of the plurality of readout scan signals in the first order in time domain, and $1 \leq n \leq M$.

These and other objectives of the present disclosure will no doubt become obvious to those of ordinary skill in the art after reading the following detailed description of the embodiment that is illustrated in the various figures and drawings.

DETAILED DESCRIPTION

Figure 1:
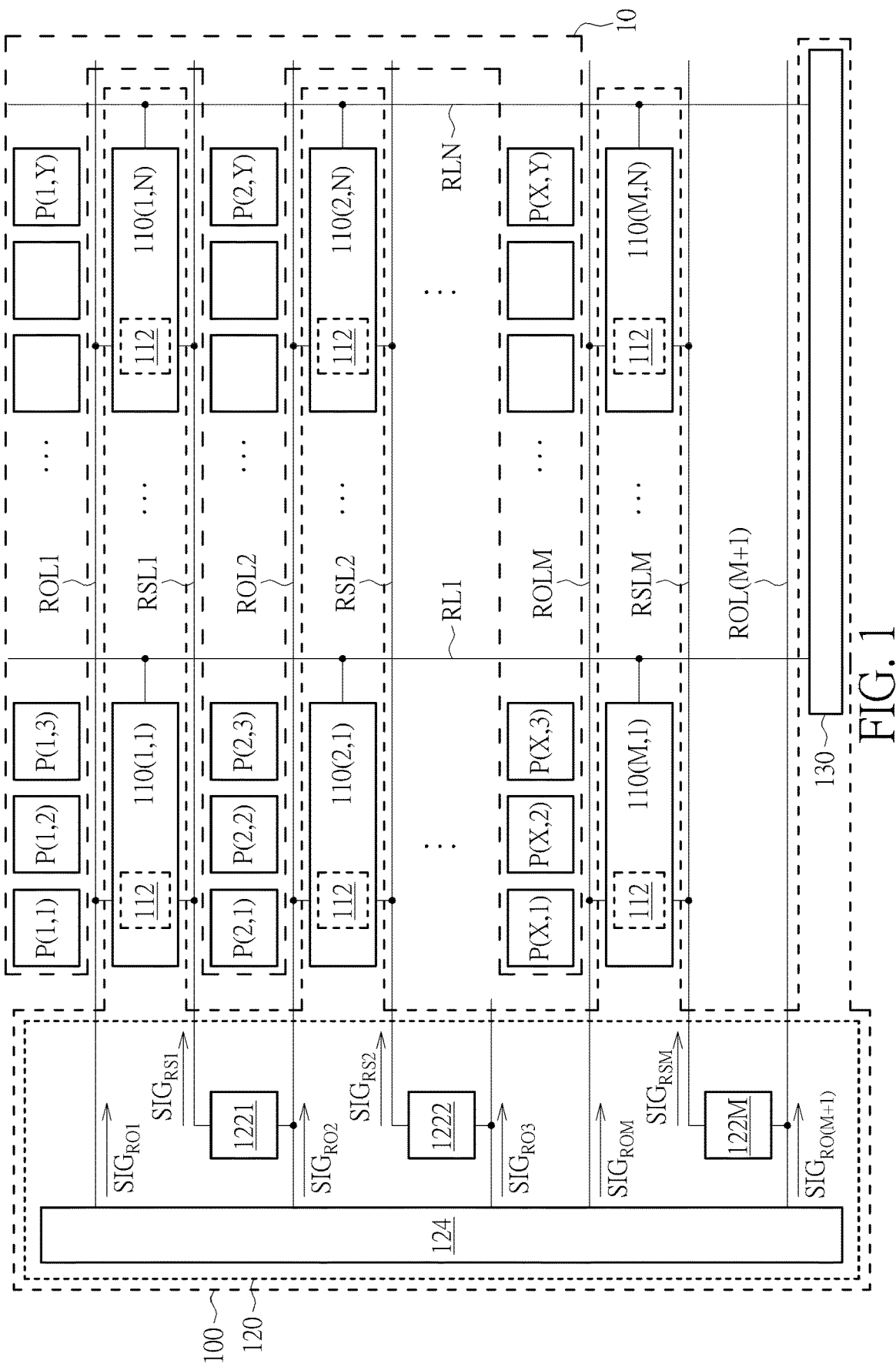
FIG. 1 is a perspective diagram of a sensing device according to an embodiment of the present disclosure.

Reference will now be made in detail to the embodiments of the present disclosure, and examples of the embodiments are illustrated in the accompanying drawings. Whenever possible, the same reference numerals are used in the drawings and descriptions to indicate the same or similar parts.

The directional terms used throughout the description and following claims, such as: "on", "up", "above", "down", "below", "front", "rear", "back", "left", "right", etc., are only directions referring to the drawings. Therefore, the directional terms are used for explaining and not used for limiting the present disclosure. Regarding the drawings, the drawings show the general characteristics of methods, structures, and/or materials used in specific embodiments. However, the drawings should not be construed as defining or limiting the scope or properties encompassed by these embodiments. For example, for clarity, the relative size, thickness, and position of each layer, each area, and/or each structure may be reduced or enlarged.

When one structure (or layer, component, substrate) described in this disclosure is located on/above another structure (or layer, component, substrate), it may mean that the two structures are adjacent and directly connected, or may mean that two structures are adjacent but not directly connected. Indirect connection means that there is at least one intermediate structure (or intermediate layer, intermediate component, intermediate substrate, intermediate space) between the two structures, and the lower surface of one structure is adjacent or is directly connected to the upper surface of the intermediate structure, the upper surface of another structure is adjacent or directly connected to the lower surface of the intermediate structure, and the intermediate structure can be composed of a single-layer or multi-layer solid structure or a non-physical structure. In this disclosure, when a structure is arranged "on" another structure, it may mean that a certain structure is "directly" on another structure, or that a certain structure is "indirectly" on another structure, that is, between a certain structure and another structure. At least one structure is disposed therebetween.

The electrical connection or coupling described in this disclosure can refer to direct connection or indirect connection. In the case of direct connection, the terminals of components of two circuits are directly connected or connected to each other by a conductive trace. In the case of indirect connection, there are switches, diodes, capacitors, inductors, resistors, other suitable components, or a combination of the above components between the terminals of components of two circuits, but it is not limited thereto.

The terms "about", "substantially", "equal", or "same" generally mean within 20% of a given value or range, or mean within 10%, 5%, 3%, 2%, 1%, or 0.5% of a given value or range.

Although terms such as first, second, third, etc., may be used to describe diverse constituent elements, such constituent elements are not limited by the terms. These terms are used only to discriminate a constituent element from other constituent elements in the specification, and these terms have no relation to the manufacturing order of these constituent components. The claims may not use the same terms, but instead may use the terms first, second, third, etc. with respect to the order in which an element is claimed. Accordingly, in the following description, a first constituent element may be a second constituent element in a claim.

It should be noted that the technical features in different embodiments described in the following can be replaced, recombined, or mixed with one another to constitute another embodiment without departing from the spirit of the present disclosure.

FIG. 1 is a perspective diagram of a sensing device 100 according to an embodiment of the present disclosure. The sensing device 100 comprises a sensing pixel 110(1,1) to a sensing pixel 110(M,N), a driving circuit 120, readout line RL1 to readout line RLN, and a data identification circuit 130, where M and N are integers greater than 1. In FIG. 1, the sensing device 100 may be integrated in the display panel 10, and the sensing pixel 110(1,1) to the sensing pixel 110(M,N) may be interlaced with a display pixel P(1,1) to a display pixel P(X, Y) in the display panel 10, but not limited thereto. The present disclosure does not limit the sensing device 100 to be arranged in the same area as the display pixel P(1,1) to the display pixel P(X,Y). In some embodiments, the sensing device 100 can also be arranged in an area different from the display pixel P(1,1) to the display pixel P(X, Y). In the present disclosure, when operating the sensing device 100, the display data in the display pixel P(1,1) to the display pixel P(X,Y) may not be updated. When the operation of the sensing device 100 is completed, the display data in the display pixel P(1,1) to the display pixel P(X, Y) can continue to be updated, but not limited thereto.

In FIG. 1, the sensing pixel 110(1,1) to the sensing pixel 110(M,N) can be arranged into M rows, each row having N sensing pixels 110. The sensing pixel 110(1,1) to the sensing pixel 110(M,N) can have the same structure and can be operated by the same principle. Exemplified by an optical fingerprint identification, when light is emitted to a texture on an object surface, such as a fingerprint of a user, since the fingerprint has lines with different concavities and convexities, reflected light with different light intensities may be generated. Take the sensing pixel 110(1,1) as an example, the sensing pixel 110(1,1) can include a photosensitive element 112, and the photosensitive element 112 may change a voltage value of a first terminal of the photosensitive element 112 according to the received light intensity and serve as a sensing voltage level.

In addition, the driving circuit 120 may be electrically connected to the sensing pixel 110(1,1) to the sensing pixel 110(M,N) through a readout scan line ROL1 to a readout scan line ROLM and a reset scan line RSL1 to a reset scan line RSLM, and can provide different scan signals to the sensing pixel 110(1,1) to the sensing pixel 110(M,N) for the sensing pixel 110(1,1) to the sensing pixel 110(M,N) to access the sensing voltage levels or reset the sensing voltage levels. The data identification circuit 130 can be electrically connected to the sensing pixel 110(1,1) to the sensing pixel 110(M,N) through the readout line RL1 to the readout line RLN, and can be used to receive the voltages from the sensing pixel 110(1,1) to the sensing pixel 110(M,N) so as to analyze or determine the corresponding sensing voltage levels. In some embodiments, when the operation period of the sensing device 100 and the operation period of the display pixel P(1,1) to the display pixel P(X,Y) in the display panel are separated from each other, the readout line RL1 to the readout line RLN can be combined with the data lines (not shown) in the display panel 10 to reduce the space occupied by the readout line RL1 to the readout line RLN. In some embodiments, the data identification circuit 130 can be integrated into the data driver (not shown) of the display panel 10 to reduce cost.

In some embodiments, the photosensitive element 112 may be a photodiode, and its main operation may include three phases: a reset phase, a sensing phase, and a read phase. In the reset phase, the voltage of the first terminal of the photosensitive element 112 may be reset to a predetermined voltage. In the sensing phase, the photosensitive element 112 may generate a leakage current due to the reverse bias of the photodiode according to the received light intensity, reducing the voltage of the first terminal of the photosensitive element 112 to a varying degree. At the end of the sensing phase, the voltage of the first terminal of the photosensitive element 112 can be regarded as the sensing voltage level of the photosensitive element 112. In the read phase, the voltage of the first terminal of the photosensitive element 112 may be output to the data identification circuit 130. In this way, the data identification circuit 130 may determine the amount of light being received by the photosensitive element 112 of the sensing pixel 110(1,1) according to the sensing voltage level, and determine the texture on the surface of the object such as a fingerprint or other textures. In the present disclosure, the photosensitive element 112 is not limited to a photodiodes, for instance, the photosensitive element 112 may be a photosensitive transistor (phototransistor).

Figure 2:
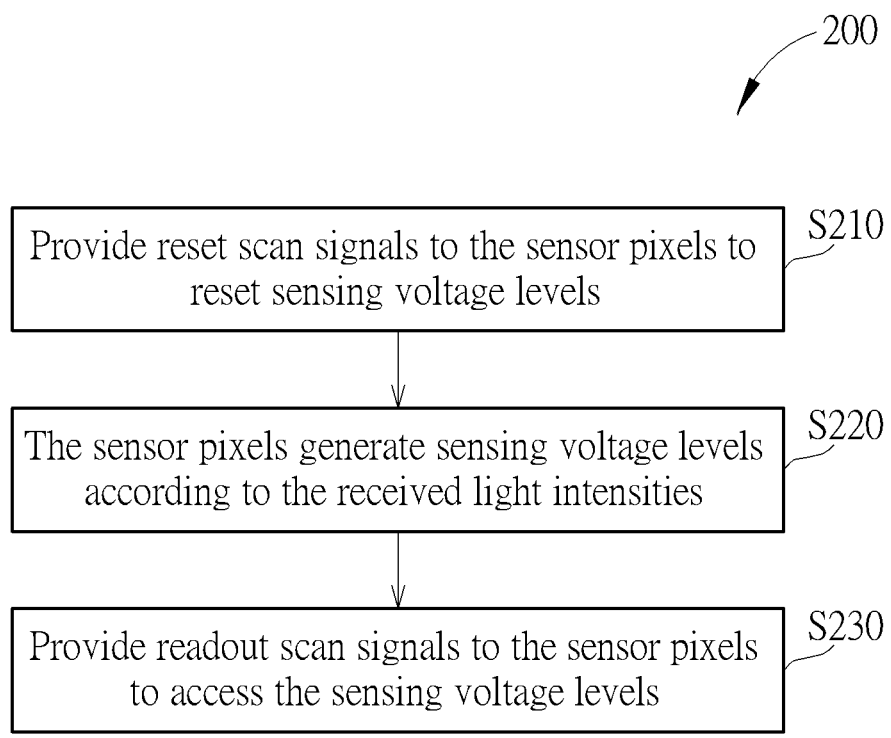
FIG. 2 is a flowchart of a method for driving the sensing pixels of the sensing device in FIG. 1.

FIG. 2 is a flowchart of a method 200 for driving the sensing pixel 110(1,1) to the sensing pixel 110(M,N). The method 200 comprises Steps S210 to S230.

S210: Provide a reset scan signal $SIG_{RS1}$ to a reset scan signal $SIG_{RSM}$ to the sensing pixel 110(1,1) to the sensing pixel 110(M,N) to reset sensing voltage levels stored therein;

S220: The sensing pixel 110(1,1) to the sensing pixel 110(M,N) generate sensing voltage levels according to the received light intensities; and S230: Provide a readout scan signal $SIG_{RO1}$ to a readout scan signal $SIG_{ROM}$ to the sensing pixel 110(1,1) to the sensing pixel 110(M,N) and the sensing pixel 110(1,1) to the sensing pixel 110(M,N) outputs a voltage according to the sensing voltage levels stored therein.

Figure 3:
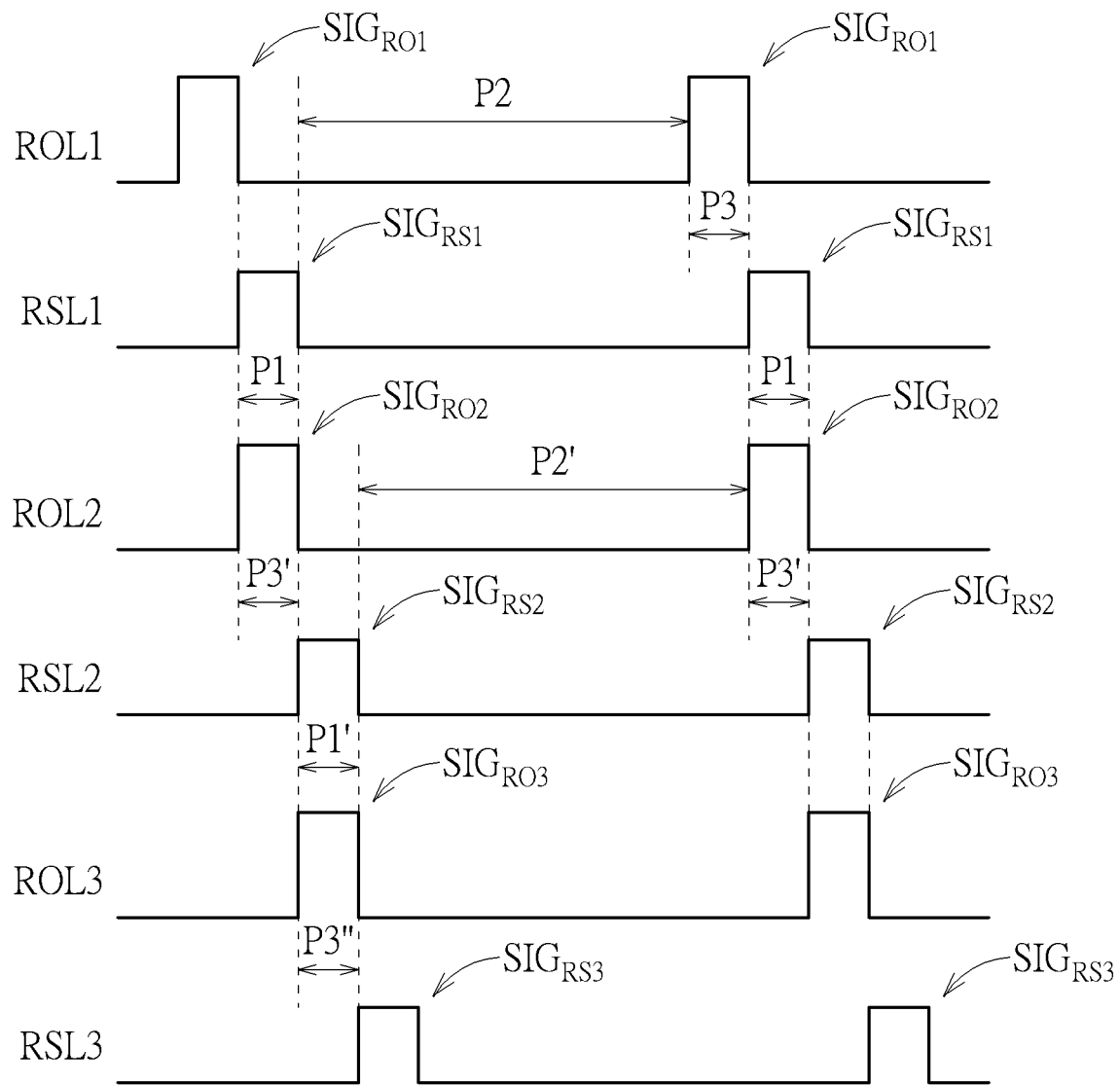
FIG. 3 is a timing diagram of part of the reset scan signals and readout scan signals in FIG. 1.

FIG. 3 is a timing diagram of part of the reset scan signals and readout scan signals in the present disclosure. In FIG. 3, the sensing pixel 110(1,1) to the sensing pixel 110(M,N) enter the reset phase P1, the sensing phase P2, and the read phase P3 row by row. For example, the driving circuit 120 may provide the reset scan signal $SIG_{RS1}$ to the sensing pixel 110(1,1) to the sensing pixel 110(1,N) in the first row and the sensing pixel 110(1,1) to the sensing pixel 110(1,N) enter the reset phase P1. At this time, the first terminals of the photosensitive element 112 of the sensing pixel 110(1,1) to the sensing pixel 110(1,N) are reset to the predetermined voltage. After the reset is completed, the sensing pixel 110(1,1) to the sensing pixel 110(1,N) can enter the sensing phase P2, at this time the voltage of the first terminals of the photosensitive element 112 of the sensing pixel 110(1,1) to the sensing pixel 110(1,N) may be changed according to the received light intensity and serve as the sensing voltage levels. After the sensing phase P2 ends, the driving circuit 120 can output the readout scan signal $SIG_{RO1}$ to the sensing pixel 110(1,1) to the sensing pixel 110(1,N) and the sensing pixel 110(1,1) to the sensing pixel 110(1,N) enter the read phase P3. At this time, the sensing pixel 110(1,1) to the sensing pixel 110(1,N) may output a voltage according to the sensing voltage levels for fingerprint recognition.

Since the sensing pixel 110(1,1) to the sensing pixel 110(M,N) are operated row by row, in this case, when the sensing pixel 110(1,1) to the sensing pixel 110(1,N) enter the reset phase P1, the sensing pixel 110(2,1) to the sensing pixel 110(2,N) in the second row can enter the read phase P3' to output the voltages according to the voltages at the first terminals of the photosensitive elements 112 of the sensing pixel 110(2,1) to the sensing pixel 110(2,N). When the sensing pixel 110(1,1) to the sensing pixel 110(1,N) in the first row enter the early stage of the sensing phase P2, the sensing pixel 110(2,1) to the sensing pixel 110(2,N) in the second row can enter the reset phase P1', and the sensing pixel 110(3,1) to the sensing pixel 110(3,N) in the third row can enter the read phase P3". Then, after the sensing pixel 110(1,1) to the sensing pixel 110(1,N) in the first row complete the read phase P3 and enter the next reset phase P1, the sensing pixel 110(2,1) to the sensing pixel 110(2,N) in the second row can enter the read phase P3'. That is, while the driving circuit 120 provides the reset scan signal $SIG_{RS1}$ to the sensing pixel 110(1,1) to the sensing pixel 110(1,N) in the first row, it may also provide the readout scan signal $SIG_{RO2}$ to the sensing pixel 110(2,1) to the sensing pixel 110(2,N) in the second row, but not limited thereto. In other words, when the driving circuit 120 provides the reset scan signal $SIG_{RS1}$ to the sensing pixel 110(1,1) to the sensing pixel 110(1,N) in the first row, it may provide the readout scan signal $SIG_{ROA}$ to the sensing pixel 110(a, 1) to the sensing pixel 110(a,N) in the ath row, where a is greater than or equal to 2, but not limited thereto. In this way, the driving circuit 120 may use a shift register 124 to generate the readout scan signal $SIG_{RO1}$ to the readout scan signal $SIG_{ROM}$ and the reset scan signal $SIG_{RS1}$ to the reset scan signal $SIG_{RSM}$, and/or reducing the components required by the driving circuit 120, and/or reducing the area required by the driving circuit 120.

In FIG. 1, the driving circuit 120 can generate the readout scan signal $SIG_{RO1}$ to the readout scan signal $SIG_{RO(M+1)}$, and can generate the reset scan signal $SIG_{RS1}$ to the reset scan signal $SIG_{RSM}$ according to the readout scan signal $SIG_{RO2}$ to the readout scan signal $SIG_{RO(M+1)}$ respectively. In this case, the readout scan line ROL(M+1) is not electrically connected to any sensing pixels, so it can be regarded as a dummy signal line, and the readout scan signal $SIG_{RO(M+1)}$ is for generating the reset scan signal $SIG_{RSM}$. In this case, the readout scan signal $SIG_{RO1}$ to the readout scan signal $SIG_{ROM}$ are provided to the sensing pixel 110(1,1) to the sensing pixel 110(M,N) row by row in a first order, the reset scan signal $SIG_{RS1}$ to the reset scan signal $SIG_{RSM}$ are provided row by row to the sensing pixel 110(1,1) to the sensing pixel 110(M,N) in a second order, and the second order is behind the first order in time.

In addition, in some embodiments, the readout scan signal $SIG_{RO1}$ to the readout scan signal $SIG_{RO(M+1)}$ and the reset scan signal $SIG_{RS1}$ to the reset scan signal $SIG_{RSM}$ may have substantially the same voltage level. In other embodiments, the readout scan signal $SIG_{RO1}$ to the readout scan signal $SIG_{RO(M+1)}$ and the reset scan signal $SIG_{RS1}$ to the reset scan signal $SIG_{RSM}$ can have different voltage levels. For example, the readout scan signal $SIG_{RO1}$ to the readout scan signal $SIG_{RO(M+1)}$ may be, for example, but not limited to, between −8 volts and 9 volts, and the reset scan signal $SIG_{RS1}$ to the reset scan signal $SIG_{RSM}$ may be, for example, but not limited to, between −5 volts and 12 volts. Therefore, the driving circuit 120 can adjust the voltage levels of the readout scan signal $SIG_{RO2}$ to the readout scan signal $SIG_{RO(M+1)}$ through level shift circuits to output the reset scan signal $SIG_{RS1}$ to the reset scan signal $SIG_{RSM}$.

For example, in FIG. 1, the driving circuit 120 may include M level shift circuits 1221 to 122M, and the level shift circuit 1221 to the level shift circuit 122M may be respectively electrically connected to the corresponding readout scan line ROL2 to the readout scan line ROL(M+1) and the corresponding reset scan line RSL1 to the reset scan line RSLM. For example, the level shift circuit 1221 is electrically connected between the readout scan line ROL2 and the reset scan line RSL1. In an embodiment, the level shift circuit 1221 may generate the reset scan signal $SIG_{RS1}$ by converting the readout scan signal $SIG_{RO2}$ on the readout scan line ROL2 to another voltage level, and the level shift circuit 1222 may generate the reset scan signal $SIG_{RS2}$ by converting the readout scan signal $SIG_{RO3}$ on the readout scan line ROL3 to another voltage level, and so on. That is, the driving circuit 120 may generate the reset scan signal $SIG_{RS1}$ according to the readout scan signal $SIG_{RO2}$. In this case, the voltage level of the readout scan signal $SIG_{RO2}$ before conversion may be higher than the voltage level of the reset scan signal $SIG_{RS1}$ after conversion. In another embodiment, the level shift circuit 1221 may convert the reset scan signal $SIG_{RS1}$ to another voltage level to generate the readout scan signal $SIG_{RO2}$, that is, the driving circuit 120 may generate the readout scan signal $SIG_{RO2}$ according to the reset scan signal $SIG_{RS1}$. In this case, the voltage level of the reset scan signal $SIG_{RS1}$ before conversion may be higher than the voltage level of the readout scan signal $SIG_{RO2}$ after conversion. But this disclosure is not limited thereto.

Figure 4:
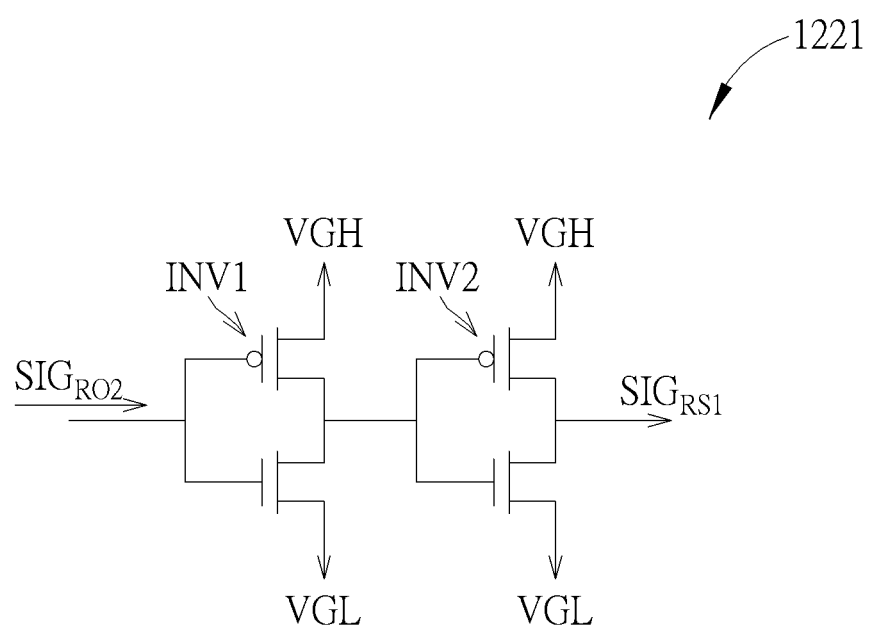
FIG. 4 is a circuit diagram of the level shift circuit in the present disclosure.

FIG. 4 is a circuit diagram of the level shift circuit 1221 according to an embodiment of the disclosure. In FIG. 4, the level shift circuit 1221 may include two inverters INV1 and INV2 electrically connected in series. A power terminal of the inverter INV1 and the inverter INV2 may be respectively electrically connected to a high voltage VGH and a low voltage VGL. Therefore, through the level shift circuit 1221, the readout scan signal $SIG_{RO2}$ can be adjusted to the high voltage VGH or the low voltage VGL according to the voltage level of the readout scan signal $SIG_{RO2}$, and outputted as the reset scan signal $SIG_{RS1}$ to the reset scan line RSL1. However, the present disclosure is not limited to the level shift circuit 1221 shown in FIG. 4. In some other embodiments, the driving circuit 120 can also use other structures or components to make a level shift circuit. In some embodiments, if the readout scan signal $SIG_{RO1}$ to the readout scan signal $SIG_{RO(M+1)}$ and the reset scan signal $SIG_{RS1}$ to the reset scan signal $SIG_{RSM}$ have substantially the same voltage level, the driving circuit 120 can also omit the level shift circuits, and directly transmit the readout scan signal $SIG_{RO2}$ to the readout scan signal $SIG_{RO(M+1)}$ to the reset scan line RSL1 to the reset scan line RSLM as the reset scan signal $SIG_{RS1}$ to the reset scan signal $SIG_{RSM}$. That is, the driving circuit 120 can directly generate the reset scan signal $SIG_{RS1}$ to the reset scan signal $SIG_{RSM}$ according to the readout scan signal $SIG_{RO2}$ to the readout scan signal $SIG_{RO(M+1)}$ respectively, but the present disclosure is not limited thereto. In other embodiments of the present disclosure, the driving circuit 120 can directly generate the readout scan signal $SIG_{RO2}$ to the readout scan signal $SIG_{RO(M+1)}$ according to the reset scan signal $SIG_{RS1}$ to the reset scan signal $SIG_{RSM}$ respectively.

Although in the embodiment of FIG. 1, the driving circuit 120 generates the reset scan signal $SIG_{RS1}$ to the reset scan signal $SIG_{RSM}$ according to the readout scan signal $SIG_{RO2}$ to the readout scan signal $SIG_{RO(M+1)}$ respectively, but in some other embodiments, the driving circuit 120 may generate the readout scan signal $SIG_{RO2}$ to the readout scan signal $SIG_{RO(M+1)}$ according to the reset scan signal $SIG_{RS1}$ to the reset scan signal $SIG_{RSM}$ respectively.

Figure 5:
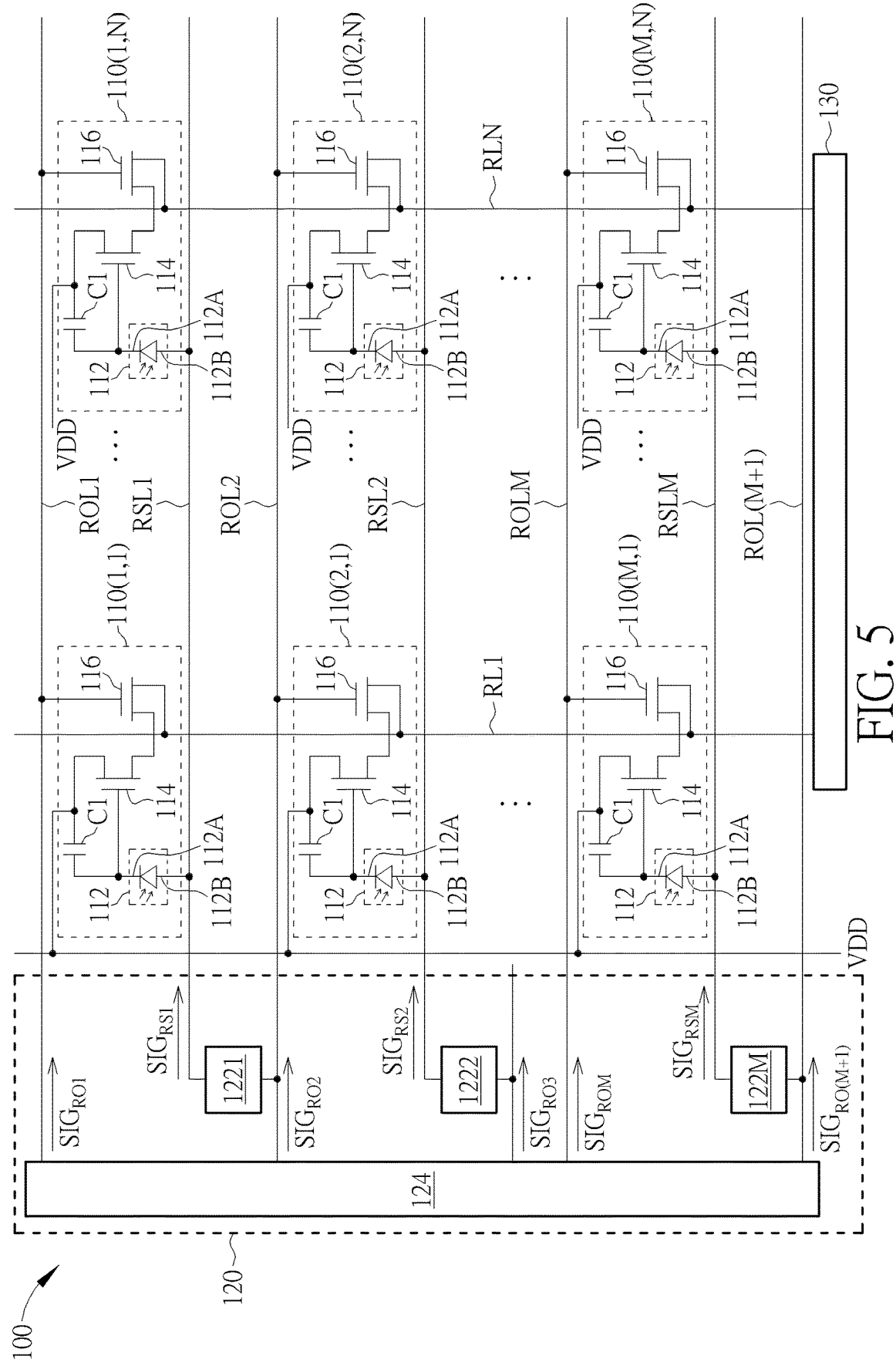
FIG. 5 is a schematic structural diagram of the sensing device in FIG. 1.

FIG. 5 is a schematic structural diagram of the sensing device 100 according to an embodiment of the disclosure. Since the sensing pixel 110(1,1) to the sensing pixel 110(M,N) can have the same structure, the following takes the sensing pixel 110(1,1) as an example to illustrate the structure and operation principle.

In FIG. 5, the sensing pixel 110(1,1) may include the photosensitive element 112, a capacitor C1, a first transistor 114, and a second transistor 116, but is not limited thereto. The photosensitive element 112 has a first terminal 112A and a second terminal 112B, and the second terminal of the photosensitive element 112 may be electrically connected to the reset scan line RSL1. The capacitor C1 has a first terminal and a second terminal. The first terminal of the capacitor C1 may be electrically connected to a constant voltage source VDD to receive the operating voltage, and the second terminal of the capacitor C1 may be electrically connected to the first terminal 112A of the photosensitive element 112. The first transistor 114 has a first terminal, a second terminal and a gate. The first terminal of the first transistor 114 may be electrically connected to the constant voltage source VDD to receive the operating voltage, and the gate of the first transistor 114 may be electrically connected to the first terminal 112A of the photosensitive element 112. The second transistor 116 has a first terminal, a second terminal and a gate, and may be electrically connected in series with the first transistor 114. The first terminal of the second transistor 116 may be electrically connected to the second terminal of the first transistor 114, the second terminal of the second transistor 116 may be electrically connected to the readout line RL1, and the gate of the second transistor 116 may be electrically connected to the readout scan line ROL1 to receive the readout scan signal $SIG_{RO1}$.

Please refer to FIG. 3 and FIG. 5. In the reset phase P1 of FIG. 3, when the second terminal 112B of the photosensitive element 112 receives the reset scan signal $SIG_{RS1}$, since the voltage of the reset scan signal $SIG_{RS1}$ can be set to be higher than the voltage of the first terminal 112A of the photosensitive element 112, the photosensitive element 112 may be operated in a forward-biased state, and the voltage of the first terminal 112A of the photosensitive element 112 may be reset to a predetermined voltage. In some embodiments, the predetermined voltage may be higher than the threshold voltage of the first transistor 114, so the first transistor 114 may be turned on. In addition, in the reset phase P1, since the drive circuit 120 has not sent the readout scan signal $SIG_{RO1}$, the second transistor 116 may be still operated in the off state.

At the end of the reset scan signal $SIG_{RS1}$, the voltage on the reset scan line RSL1 returns to a low voltage level. In some embodiments, the photosensitive element 112 is implemented as a photodiode. In this case, since the capacitor C1 may maintain the first terminal 112A of the photosensitive element 112 at the predetermined voltage, the parasitic capacitance of the photodiode coupling the voltage of the first terminal 112A of the photosensitive element 112 may be reduced when the reset scan line RSL1 returns to the low voltage level, and keeping the first transistor 114 turned on.

Then, the sensing pixel 110(1,1) enters the sensing phase P2. In the sensing phase P2, the photosensitive element 112 receives the light reflected from the surface of the object (for example, a fingerprint), and generates leakage current with different magnitudes according to the received light intensity. In some embodiments, when the received light is stronger, the leakage current generated by the photosensitive element 112 will be higher, so the voltage of the first terminal 112A of the photosensitive element 112 may be decreased. When the sensing phase P2 ends, the voltage of the first terminal 112A of the photosensitive element 112 may be reduced due to the continuous leakage of current and used as the sensing voltage level, and the first transistor 114 may adjust its conduction state according to the magnitude of the sensing voltage level.

In the read phase P3, the readout scan signal $SIG_{RO1}$ turns on the second transistor 116. Since the sensing voltage level at the first terminal 112A of the photosensitive element 112 will be less than or equal to the voltage of the constant voltage source VDD after light exposure, the conduction level of the first transistor 114 will be related to the sensing voltage level at the first terminal 112A of the photosensitive element 112, and the first transistor 114 adjusts the voltage transmitted to the readout line RL1 to be substantially equal to the sensing voltage level at the first terminal 112A of the photosensitive element 112. In some embodiments, the first transistor 114 may be regarded as a source follower. In this way, according to the magnitude of the voltage output by the readout line RL1, the data identification circuit 130 may determine the intensity of light received by the sensing pixel 110(1,1) in the sensing phase P2. Similarly, the sensing pixel 110(1,2) to the sensing pixel 110(1,N) also located in the first row will also output a voltage substantially equal to the respective sensing voltage levels through the readout line RL2 to the readout line RLN respectively in the read phase P3 to the data identification circuit 130 to interpret or analyze the intensities of light received in the sensing pixel 110(1,2) to the sensing pixel 110(1,N).

Figure 6:
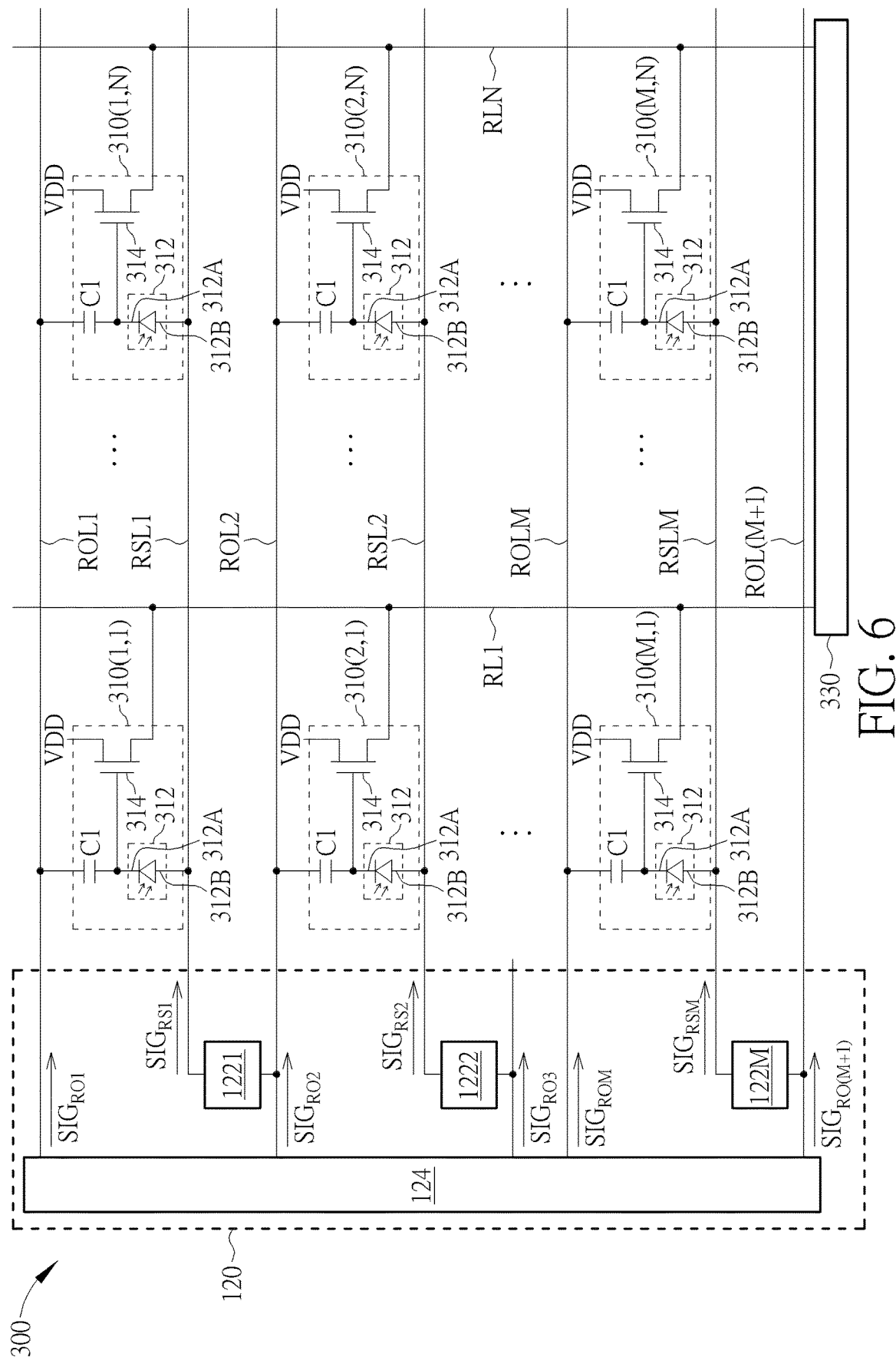
FIG. 6 is a schematic structural diagram of a sensing device according to another embodiment of the disclosure.

FIG. 6 is a schematic structural diagram of a sensing device 300 according to an embodiment of the disclosure. The sensing device 300 and the sensing device 100 may have a similar structure, and may operate according to the method 200 of FIG. 2. The sensing device 300 may include sensing pixels 310(1,1) to 310(M,N). Since the sensing pixels 310(1,1) to 310(M,N) may have the same structure, the following uses the sensing pixel 310(1,1) as an example to illustrate the structure and operation principle thereof.

In FIG. 6, the sensing pixel 310(1,1) may include a photosensitive element 312, a capacitor C1, and a first transistor 314. The photosensitive element 312 has a first terminal 312A and a second terminal 312B, and the second terminal 312B of the photosensitive element 312 may be electrically connected to the reset scan line RSL1. The capacitor C1 has a first terminal and a second terminal. The first terminal of the capacitor C1 may be electrically connected to the readout scan line ROL1 to receive the readout scan signal $SIG_{RO1}$, and the second terminal of the capacitor C1 may be electrically connected to the first terminal 312A of the photosensitive element 312. The first transistor 314 has a first terminal, a second terminal and a gate. The first terminal of the first transistor 314 may be electrically connected to a constant voltage source VDD to receive the operating voltage, and the second terminal of the first transistor 314 may be electrically connected to the readout line RL1, and the gate of the first transistor 314 may be electrically connected to the first terminal 312A of the photosensitive element 312.

In some embodiments, the driving circuit 120 of the sensing device 300 can operate according to the signal timing of FIG. 3. Please refer to FIG. 3 and FIG. 6. In the reset phase P1, when the second terminal 312B of the photosensitive element 312 receives the reset scan signal $SIG_{RS1}$, the voltage of the reset scan signal $SIG_{RS1}$ can be set to be higher than the voltage of the first terminal 312A of the photosensitive element 312, so the photosensitive element 312 will operate in a forward-biased state, so that the voltage of the first terminal 312A of the photosensitive element 312 is reset to a predetermined voltage. In some embodiments, the predetermined voltage may be less than the threshold voltage of the first transistor 314, so the first transistor 314 may be in the off state.

At the end of the reset scan signal $SIG_{RS1}$, the voltage on the reset scan line RSL1 returns to a low level, and the sensing pixel 310(1,1) enters the sensing phase P2. As mentioned above, in some embodiments, the photosensitive element 312 is implemented as a photodiode. At this time, the photosensitive element 312 will generate leakage currents of different magnitudes according to the intensities of the received light. At the end of the sensing phase P2, the voltage of the first terminal 312A of the photosensitive element 312 may be reduced due to the continuous leakage of current and used as the sensing voltage level.

In the read phase P3, the first terminal of the capacitor C1 will receive the readout scan signal $SIG_{RO1}$. At this time, the voltage of the second terminal of the capacitor C1 will be increased accordingly and turning on the first transistor 314. A voltage substantially equal to the sensing voltage level may be output to the readout line RL1. Therefore, according to the magnitude of the voltage output by the readout line RL1, the data identification circuit 330 can determine the intensity of light received by the sensing pixel 310(1,1) in the sensing phase P2. Similarly, the sensing pixel 310(1,2) to the sensing pixel 310(1,N) also located in the first row may also output a voltage to the data identification circuit 330 through the readout line RL2 to the readout line RLN in the read phase P3, which are substantially equal to their respective sensing voltage levels. The sensing voltage levels are used for the data identification circuit 330 to interpret or analyze the intensities of light received in the sensing pixel 310(1,2) to the sensing pixel 310(1,N).

Since the sensing device 300 can also operate according to the signal timing of FIG. 3, the driving circuit 120 may use the shift register 124 to generate the readout scan signal $SIG_{RO1}$ to the readout scan signal $SIG_{ROM}$ and the reset scan signal $SIG_{RS1}$ to the reset scan signal $SIG_{RSM}$, and/or reducing the components required by the driving circuit 120 and/or the area required by the driving circuit 120. In addition, compared to the sensing pixel 110(1,1) to the sensing pixel 110 (M,N), the sensing pixel 310(1,1) to the sensing pixel 310(M,N) may require fewer transistors, so the overall area required by the sensing device 300 may be reduced.

Figure 7:
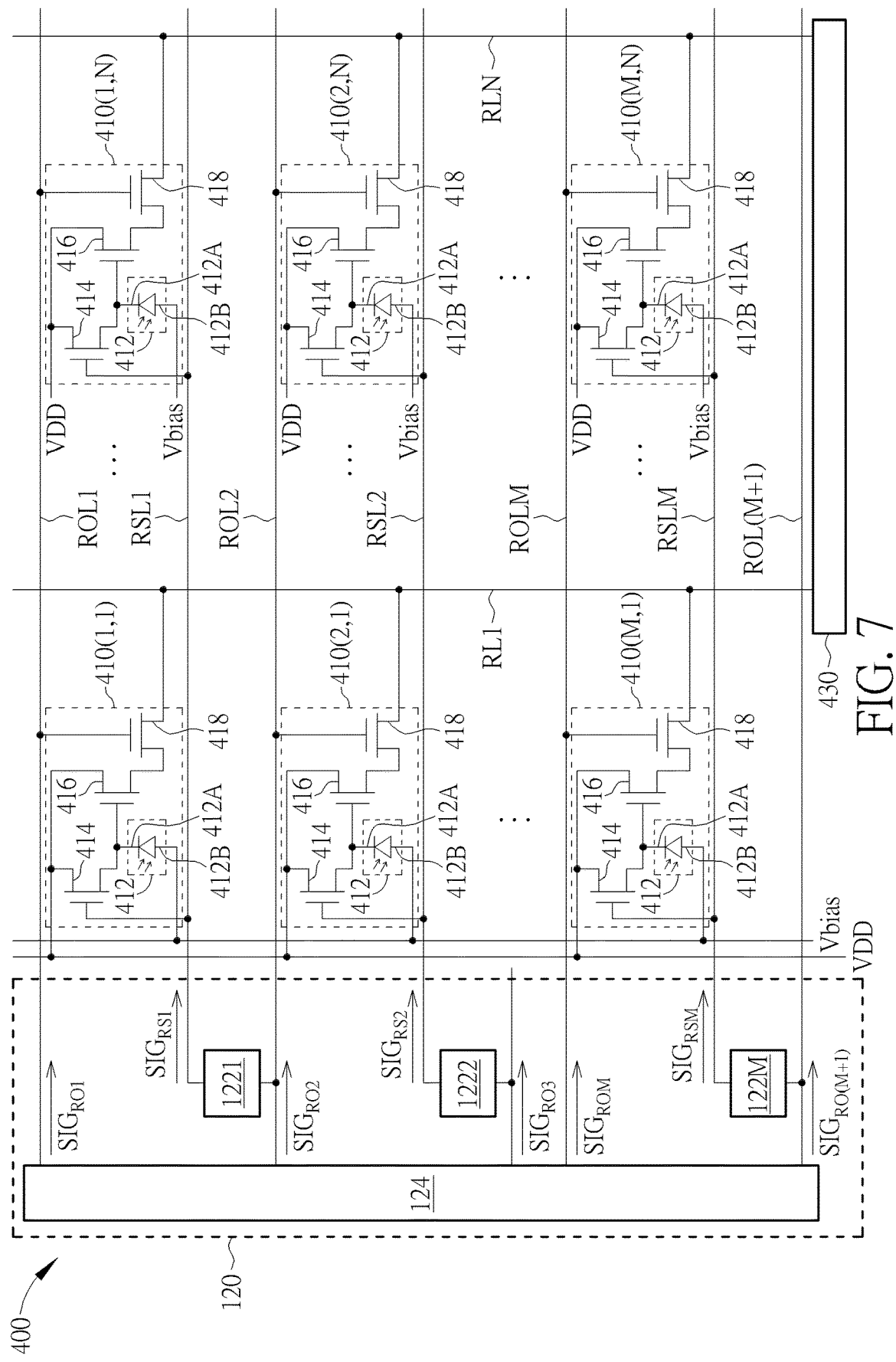
FIG. 7 is a schematic structural diagram of a sensing device according to another embodiment of the disclosure.

FIG. 7 is a schematic structural diagram of a sensing device 400 according to an embodiment of the disclosure. The sensing device 400 may include a sensing pixel 410(1,1) to a sensing pixel 410(M,N), a driving circuit 120 and a data identification circuit 430. The sensing pixel 410(1,1) to the sensing pixel 410(M,N) can have the same structure. Therefore, the following uses the sensing pixel 410(1,1) as an example to illustrate the structure and operation principle.

In FIG. 7, the sensing pixel 410(1,1) may include a photosensitive element 412, a first transistor 414, a second transistor 416, and a third transistor 418, but is not limited thereto. The photosensitive element 412 has a first terminal 412A and a second terminal 412B, and the second terminal 412B of the photosensitive element 412 may be electrically connected to a constant voltage source Vbias. The first transistor 414 has a first terminal, a second terminal and a gate. The first terminal of the first transistor 414 may be electrically connected to a constant voltage source VDD to receive the operating voltage, the second terminal of the first transistor 414 may be electrically connected to the first terminal 412A of the photosensitive element 412, and the gate of the first transistor 414 may be electrically connected to the reset scan line RSL1. The second transistor 416 has a first terminal, a second terminal and a gate. The first terminal of the second transistor 416 may be electrically connected to the constant voltage source VDD to receive the operating voltage, and the gate of the second transistor 416 may be electrically connected to the first terminal 412A of the photosensitive element 412. The third transistor 418 has a first terminal, a second terminal and a gate, and may be electrically connected in series with the second transistor 416. The first terminal of the third transistor 418 may be electrically connected to the second terminal of the second transistor 416, the second terminal of the third transistor 418 may be electrically connected to the readout line RL1, and the gate of the third transistor 418 may be electrically connected to the readout scan line ROL1 to receive the readout scan signal $SIG_{RO1}$.

Please refer to FIG. 3 and FIG. 7. In the reset phase P1 of FIG. 3, when the gate of the first transistor 414 receives the reset scan signal $SIG_{RS1}$, the first transistor 414 is turned on and the voltage of the first terminal 412A of the photosensitive element 412 may be reset to a predetermined voltage. In some embodiments, the predetermined voltage may be higher than the threshold voltage of the second transistor 416, so the second transistor 416 may be turned on. In addition, in the reset phase P1, since the driving circuit 120 has not sent the readout scan signal $SIG_{RO1}$, the third transistor 418 may be turned off.

At the end of the reset scan signal $SIG_{RS1}$, the voltage on the reset scan line RSL1 returns to a low level, and the sensing pixel 410(1,1) enters the sensing phase P2. As mentioned above, in some embodiments, the photosensitive element 412 is implemented as a photodiode. When the sensing phase P2 ends, the voltage of the first terminal 412A of the photosensitive element 412 may be reduced due to the continuous leakage of current and used as the sensing voltage level.

In the read phase P3, the readout scan signal SIGRO1 turns on the third transistor 418. Therefore, according to the magnitude of the voltage output by the readout line RL1, the data identification circuit 430 can determine the intensity of light received by the sensing pixel 410(1,1) in the sensing phase P2. Similarly, the sensing pixel 410(1,2) to the sensing pixel 410(1,N) also located in the first row may also output voltages substantially equal to their respective sensing voltage levels through the readout line RL2 to the readout line RLN in the read phase P3. The sensing voltage levels are used by the data identification circuit 430 to interpret or analyze the intensities of light received in the sensing pixel 410(1,2) to the sensing pixel 410(1,N).

In summary, the sensing device and method for driving sensing pixels provided by the embodiments of the present disclosure can provide readout scan signals and reset scan signals to sensing pixels in two adjacent rows, thus simplifying generation of the scan signals. The driving circuit may use the same set of shift registers to generate readout scan signals and reset scan signals, and/or reducing the area of the driving circuit.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A method for driving a plurality of sensing pixels, each of the plurality of sensing pixels storing a sensing voltage level, the method comprising:
   providing a plurality of readout scan signals to the plurality of sensing pixels via M readout scan lines, M being an integer, one of the plurality of readout scan signals enabling one of the plurality of sensing pixels to output the sensing voltage level stored in the one of the plurality of sensing pixels; and
   providing a plurality of reset scan signals to the plurality of sensing pixels via M reset scan lines, one of the plurality of reset scan signals resetting the sensing voltage level stored in the one of the plurality of sensing pixels;
   wherein the plurality of readout scan signals are outputted to the plurality of sensing pixels in a first order and the plurality of reset scan signals are outputted to the plurality of sensing pixels in a second order, an $n^{th}$ reset scan signal of the plurality of reset scan signals in the second order is started behind an $n^{th}$ readout scan signal of the plurality of readout scan signals in the first order in time domain, and $1 \leq n \leq M$;
   wherein each of the plurality of sensing pixels comprises a photosensitive element with a first terminal and a second terminal, the sensing voltage level is stored at the first terminal of the photosensitive element, and the sensing voltage level stored in the one of the plurality of sensing pixels is reset when the one of the plurality of reset scan signals is provided at the second terminal of the photosensitive element;
   wherein the one of the reset scan signals is provided at the second terminal of the photosensitive element so that the photosensitive element becomes forward-biased and the sensing voltage level is reset to a predetermined level; and
   wherein each of the plurality of sensing pixels further comprises a first transistor and a second transistor, a gate of the first transistor is electrically connected to the first terminal of the photosensitive element, a gate of the second transistor is for receiving the one of the plurality of readout scan signals, the first transistor and the second transistor are serially electrically connected, and the predetermined level is higher than a threshold voltage of the first transistor.

2. The method of claim 1, wherein each of the plurality of sensing pixels further comprises a capacitor, and the first terminal of the photosensitive element receives the one of the plurality of readout scan signals via the capacitor so that the first transistor is turned on.

3. The method of claim 1, wherein each of the plurality of sensing pixels further comprises a capacitor, and the first terminal of the photosensitive element is electrically connected to a constant voltage source through the capacitor.

4. The method of claim 1, wherein one of the plurality of readout scan signals is generated according to one of the plurality of reset scan signals or one of the plurality of reset scan signals is generated according to one of the plurality of readout scan signals.

5. The method of claim 1, wherein the one of the plurality of readout scan signals is generated according to the one of the plurality of reset scan signals with a level shifter.

6. The method of claim 1, wherein the one of the plurality of reset scan signals is generated according to the one of the plurality of readout scan signals with a level shifter.

7. A sensing device comprising:
   a plurality of sensing pixels, each of the plurality of sensing pixel configured to store a sensing voltage level; and
   a driving circuit electrically connected to the plurality of sensing pixels, the driving circuit configured to:
      provide a plurality of readout scan signals to the plurality of sensing pixels via M readout scan lines, M being an integer, one of the plurality of readout scan signals enabling one of the plurality of sensing pixels to output the sensing voltage level stored in the one of the plurality of sensing pixels; and
      provide a plurality of reset scan signals to the plurality of sensing pixels via M reset scan lines, one of the plurality of reset scan signals resetting the sensing voltage level stored in one of the plurality of sensing pixels;
   wherein the plurality of readout scan signals are outputted to the plurality of sensing pixels in a first order and the plurality of reset scan signals are outputted to the plurality of sensing pixels in a second order, an $n^{th}$ reset scan signal of the plurality of reset scan signals in the second order is started behind an $n_{th}$ readout scan signal of the plurality of readout scan signals in the first order in time domain, and $1 \leq n \leq M$;
   wherein the plurality of sensing pixels comprise a first sensing pixel disposed on a first row and a second sensing pixel disposed on a second row;
   wherein the plurality of readout scan signals comprise a first readout scan signal and a second readout scan signal;
   wherein the driving circuit provides the first readout scan signal to the first sensing pixel and the second readout scan signal to the second sensing pixel in order; and
   wherein the driving circuit provides the second readout scan signal to the second sensing pixel and a first reset scan signal of the plurality of reset scan signals to the first sensing pixel synchronously.

8. The sensing device of claim 7, wherein each of the plurality of sensing pixels comprises a photosensitive element with a first terminal and a second terminal, and each of the plurality of sensing pixels stores the sensing voltage level at the first terminal of the photosensitive element.

9. The sensing device of claim 8, wherein the one of the plurality of reset scan signals is provided at the second terminal of the photosensitive element.

10. The sensing device of claim 8, wherein each of the plurality of sensing pixels further comprises a first transistor and a gate of the first transistor is electrically connected to the first terminal of the photosensitive element.

11. The sensing device of claim 8, wherein each of the plurality of sensing pixels further comprises a capacitor, and the first terminal of the photosensitive element received the one of the plurality of readout scan signals via the capacitor.

12. The sensing device of claim 8, wherein each of the plurality of sensing pixels further comprises a capacitor, and the first terminal of the photosensitive element is electrically connected to a constant voltage source through the capacitor.

13. The sensing device of claim 7, wherein one of the plurality of readout scan signals is generated according to one of the plurality of reset scan signals or one of the plurality of reset scan signals is generated according to one of the plurality of readout scan signals.

14. A sensing device comprising:
a plurality of sensing pixels, each of the plurality of sensing pixel configured to store a sensing voltage level; and
a driving circuit electrically connected to the plurality of sensing pixels, the driving circuit configured to:
provide a plurality of readout scan signals to the plurality of sensing pixels via M readout scan lines, M being an integer, one of the plurality of readout scan signals enabling one of the plurality of sensing pixels to output the sensing voltage level stored in the one of the plurality of sensing pixels; and
provide a plurality of reset scan signals to the plurality of sensing pixels via M reset scan lines, one of the plurality of reset scan signals resetting the sensing voltage level stored in one of the plurality of sensing pixels;
wherein the plurality of readout scan signals are outputted to the plurality of sensing pixels in a first order and the plurality of reset scan signals are outputted to the plurality of sensing pixels in a second order, an $n^{th}$ reset scan signal of the plurality of reset scan signals in the second order is started behind an $n^{th}$ readout scan signal of the plurality of readout scan signals in the first order in time domain, and $1 \leq n \leq M$;
wherein each of the plurality of sensing pixels comprises a photosensitive element with a first terminal and a second terminal, and each of the plurality of sensing pixels stores the sensing voltage level at the first terminal of the photosensitive element; and
wherein each of the plurality of sensing pixels further comprises a first transistor and a second transistor, a gate of the first transistor is electrically connected to the first terminal of the photosensitive element, a gate of the second transistor is for receiving the one of the plurality of readout scan signals, and the first transistor and the second transistor are electrically connected in series.

15. The sensing device of claim 14, wherein each of the plurality of sensing pixels further comprises a capacitor, and the first terminal of the photosensitive element is electrically connected to a constant voltage source through the capacitor.

16. The sensing device of claim 14, wherein one of the plurality of readout scan signals is generated according to one of the plurality of reset scan signals or one of the plurality of reset scan signals is generated according to one of the plurality of readout scan signals.

* * * * *